United States Patent
Hawkins et al.

(10) Patent No.: US 6,252,697 B1
(45) Date of Patent: Jun. 26, 2001

(54) MECHANICAL GRATING DEVICE

(75) Inventors: Gilbert A. Hawkins, Mendon; John A. Lebens, Rush; Constantine N. Anagnostopoulos, Mendon; John C. Brazas, Jr., Hilton; Brian E. Kruschwitz, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/216,289

(22) Filed: Dec. 18, 1998

(51) Int. Cl.[7] ............................................. G02B 26/00
(52) U.S. Cl. ................................. 359/290; 291/573
(58) Field of Search ........................... 359/290, 291, 359/295, 572, 573, 224

(56) References Cited

U.S. PATENT DOCUMENTS

| | | | |
|---|---|---|---|
| 5,311,360 | 5/1994 | Bloom et al. ........................ 359/572 |
| 5,661,592 | 8/1997 | Bornstein et al. ................... 359/291 |
| 5,677,783 | 10/1997 | Bloom et al. ........................ 359/224 |
| 5,949,570 | * 9/1999 | Shiono et al. ...................... 359/291 |
| 5,999,319 | * 12/1999 | Castracane ......................... 359/573 |

* cited by examiner

*Primary Examiner*—Georgia Epps
*Assistant Examiner*—Tim Thompson
(74) *Attorney, Agent, or Firm*—Thomas H. Close; Stephen H. Shaw (57) ABSTRACT

A mechanical grating device for diffracting an incident light beam has a base which defines a surface. A spacer layer is provided above the base, said spacer layer defining an upper surface of said spacer layer. A longitudinal channel is formed in said spacer layer, said channel having a first and second opposing side walls and a bottom. The side walls are substantially vertically disposed with respect to the bottom, and said channel having a constant cross section along the entire length of the mechanical grating device. A plurality of spaced apart deformable ribbon elements are disposed parallel to each other and span the channel. The deformable ribbon elements are fixed to the upper surface of the spacer layer on each side of the channel.

26 Claims, 5 Drawing Sheets

MECHANICAL GRATING DEVICE

CROSS REFERENCE TO RELATED APPLICATIONS

Reference is made to U.S. Ser. No. 09/216,202 filed Dec. 18, 1998 entitled Process for Manufacturing an Electro-Mechanical Grating Device; and further reference is made to U.S. Ser. No. 09/215,973 filed Dec. 18, 1998 entitled Method for Producing Co-Planar Surface Structures.

FIELD OF THE INVENTION

This invention relates to the field of modulation of an incident light beam by the use of a mechanical grating device. More particularly, this invention discloses a mechanical grating device which has a significant improvement in the output of the diffracted light beam.

BACKGROUND OF THE INVENTION

Advances in micromachining technology have given rise to a variety of Micro-electromechanical systems (MEMS) including light modulators for low cost display applications. Such modulators provide high-resolution, high operating speeds (KHz frame rates), multiple gray scale levels, color adaptability, high contrast ratio, and compatibility with VLSI technology. One such modulator has been disclosed in U.S. Pat. No. 5,311,360, issued May 10, 1994 to Bloom et al., entitled "Method and Apparatus for Modulating a Light Beam". This modulator is a micromachined reflective phase grating. It consists of a plurality of equally spaced deformable elements in the form of beams suspended at both ends above a substrate thereby forming a grating. The deformable elements have a metallic layer that serves both as an electrode, and as reflective surface for incident light. The substrate is also reflective and contains a separate electrode. The deformable elements are designed to have a thickness equal to $\lambda/4$ where $\lambda$ is the wavelength of the incident light source. They are supported a distance of $\lambda/4$ above, and parallel to, the substrate. When the deformable elements are actuated (for example a sufficient switching voltage is applied), the deformable are pulled down and the incident light is diffracted. Optical systems can intercept the diffracted light. For display applications, a number of deformable elements are grouped for simultaneous activation thereby defining a pixel, and arrays of such pixels are used to form an image. Furthermore, since gratings are inherently dispersive, this modulator can be used for color displays.

Figure 1:
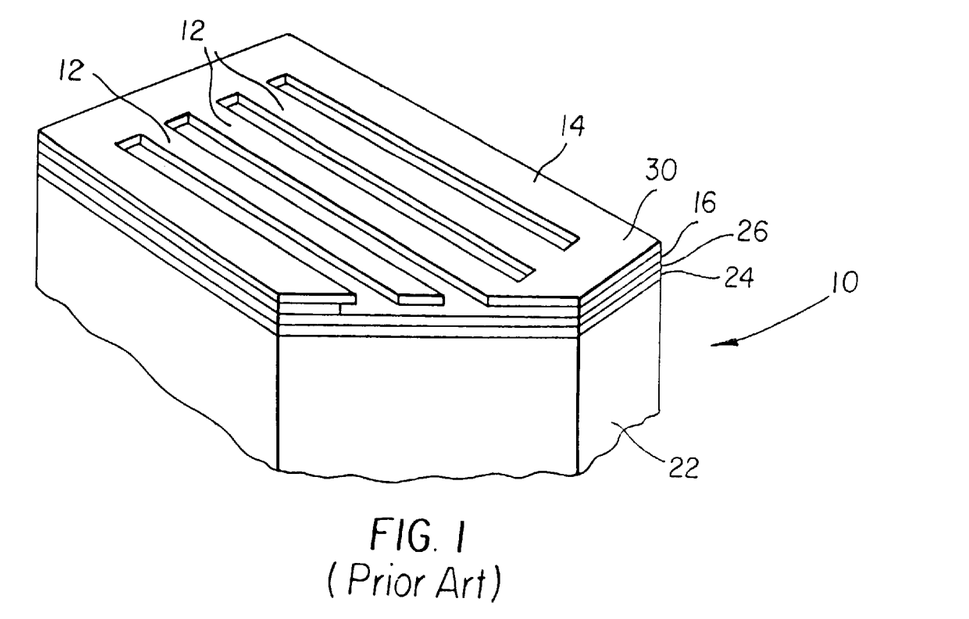
FIG. 1 is a perspective, partially cut-away view of the prior art grating device.

U.S. Pat. No. 5,677,783, issued Oct. 14, 1997 to Bloom et al., entitled "Method of Making a Deformable Grating Apparatus for Modulating a Light Beam and Including Means for Obviating Stiction Between Grating Elements and Underlying Substrate" discloses a method of making a deformable grating apparatus for modulating a light beam and including means for obviating stiction between grating elements and underlying substrate. Referring to FIG. 1, a perspective cut-away view of a prior art light modulator 10 is shown. An insulating protective layer 24 is deposited on a silicon substrate 22. This is followed by the deposition of a sacrificial silicon dioxide layer 16. A silicon nitride layer 26 is next deposited in which is defined the deformable elements 12. Both the thickness of the sacrificial silicon dioxide layer 16 and the silicon nitride layer 26 are critical in determining the amplitude modulation and thus the efficiency of the grating device. In order to achieve freestanding beams the sacrificial silicon dioxide layer 16 is etched away in the active area. The remaining sacrificial silicon dioxide layer 16 not removed acts as a supporting frame 14 for the deformable elements 12. The last fabrication step provides an aluminum film 30 in order to enhance the reflectance of the beams and to provide an electrode for application of a voltage between the deformable elements 12 and the substrate 22.

There are many problems with this prior art device. The thickness of both the sacrificial oxide layer 16 and silicon nitride layer 26 have to each be $\lambda/4$. Because these thicknesses determine the grating amplitude of the modulator, their dimensions are critical. Variations in either of these thicknesses will result in unwanted diffraction of light in the off state, as well as lower diffraction efficiency in the on state, thus lower contrast ratios. There is no freedom to adjust the thickness of the deformable element 12 for optimization of its mechanical properties.

There is no defined etch stop in the device structure during removal of the sacrificial oxide layer 16. This requires a carefully controlled time-dependent etch to ensure that the remaining sacrificial oxide layer 16 is able act as the supporting frame 14. The profile left by the wet etch openings between the beams leaves an uneven wall below the deformable elements 12 where they contact the supporting frame 14. Such effects will cause variations in the electromechanical properties of the devices. The etching process to remove the sacrificial oxide layer is also a wet process. During this wet processing step it has been seen that stiction tends to occur in that the deformable elements tend to adhere and remain adhered to the substrate. Special drying techniques can be used to overcome this problem but complicate the process. Removal of the sacrificial layer using a dry process is preferred.

U.S. Pat. No. 5,661,592, issued Oct. 14, 1997 to Bornstein et al., entitled "Method of Making and an Apparatus for a Flat Diffraction Grating Light Valve" discloses a method for making a deformable grating apparatus which attempts to address the problems associated with this prior art device. An insulating layer is deposited on the substrate. A phosphosilicate glass(PSG) sacrificial layer is next deposited. The phosphosilicate glass(PSG) sacrificial layer is selectively patterned removing the phosphosilicate glass(PSG) sacrificial layer except in regions where the deformable grating elements are to be formed. The phosphosilicate glass(PSG) is reflowed at high temperature to lower the angle of its sidewall. Silicon nitride is then deposited conformally over the phosphosilicate glass(PSG) and patterned into deformable elements. The phosphosilicate glass(PSG) sacrificial layer is then removed by wet etching. By selectively patterning the phosphosilicate glass(PSG) sacrificial layer the region under the beams is more uniform relying now on the uniformity of the reflow of the phosphosilicate glass(PSG) sacrificial layer. However the removal of the phosphosilicate glass(PSG) sacrificial layer is still a wet process with the corresponding disadvantages as described above. The conformal deposition of the silicon nitride over the step height formed by the patterned phosphosilicate glass(PSG) sacrificial layer region also has topography determined by the step height. In patterning the deformable elements this topography will limit the minimum spacing between the deformable elements. Increased spacing between elements will cause increased light scattering decreasing the efficiency of the grating. The use of a phosphosilicate glass(PSG) sacrificial layer also requires a high temperature reflow step that would complicate its integration with CMOS circuitry on the same substrate.

There is one problem with the prior art devices, which is, not to provide deformable ribbon elements with a constant cross-section along the entire length of the device. According to this drawback the efficiency of the diffraction grating device is lowered.

SUMMARY OF THE INVENTION

It is an object of the present invention to provide a mechanical grating device which has equal actuation conditions for the deformable elements in order to improve the diffraction efficiency of the device.

The object is achieved with a mechanical grating device comprising: a base having a surface; a spacer layer provided above the base, said spacer layer defining an upper surface and a longitudinal channel is formed in said spacer layer, said channel having a first and second opposing side wall and a bottom, said side walls being substantially vertically disposed with respect to the bottom, and said channel having a constant cross section along the entire length of the mechanical grating device; and a plurality of spaced apart deformable ribbon elements disposed parallel to each other and spanning the channel, said deformable ribbon elements are fixed to the upper surface of the spacer layer on each side of the channel.

Another object is to provide a electromechanical grating device which has equal actuation conditions for the deformable elements of the device in order to improve the diffraction efficiency of the device.

These objects are achieved with a electromechanical grating device comprising: a base having a surface; a bottom conductive layer provided within said base; a spacer layer provided above the base, said spacer layer defining an upper surface and a longitudinal channel formed in said spacer layer, said channel having a first and second opposing side wall and a bottom, said side walls being substantially vertically disposed with respect to the bottom, and said channel having a constant cross section along the entire length of the mechanical grating device; and a plurality of spaced apart deformable ribbon elements disposed parallel to each other and spanning the channel, said deformable ribbon elements are fixed to the upper surface of the spacer layer on each side of the channel and each deformable ribbon element is provided with a conductive layer.

An advantage of the mechanical or the electromechanical grating device of the present invention is that an improved definition of the position of the channel walls beneath the deformable ribbon elements allow reproducible ribbon length. The reproducible length of the deformable ribbon elements affects resonance frequency, speed of actuation, damping affects due to resonance coupling, and air flow restriction beneath continuous areas of the ribbon layer, etc. A further advantage is that the actuation can be carried out for example by heat or mechanical force activation. Actuation is a deformation of the ribbon resulting from an applied force to affect the height of the ribbons above a substrate.

An advantage of the electromechanical grating device is that the formation of a ground plane at the surface of the substrate (for example silicon wafer or glass) allows top side access and better charge confinement within the substrate.

Additionally, the structure and materials of the device are selected to be compatible with standard CMOS fabrication methods and allow a fabrication process sequence that make the fabrication of the electromechanical grating device compatible with the integration of CMOS circuitry.

BRIEF DESCRIPTION OF THE DRAWINGS

The subject matter of the invention is described with reference to the embodiments shown in the drawing.

DETAILED DESCRIPTION OF THE INVENTION

Figure 2:
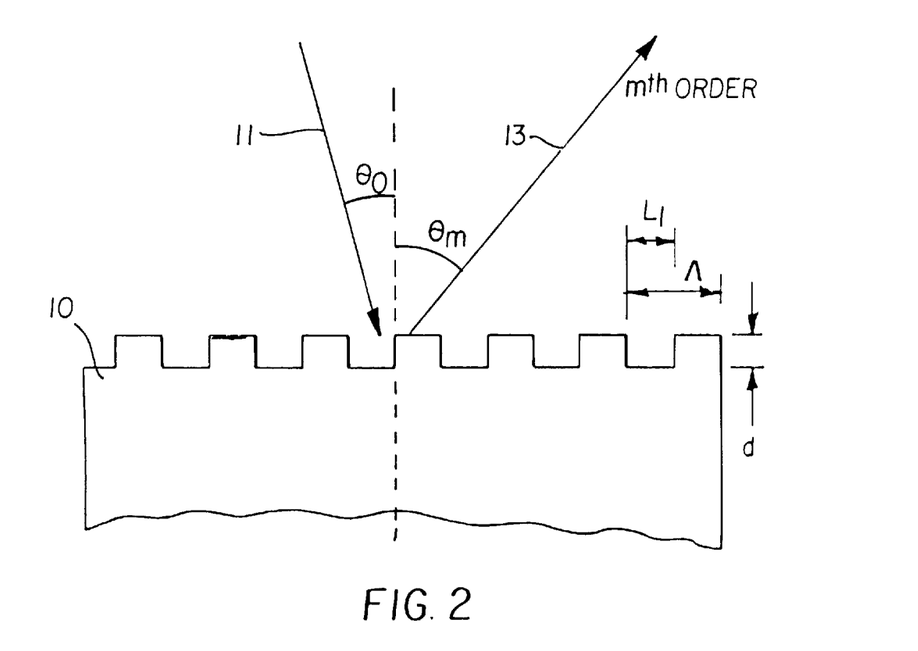
FIG. 2 is an illustration of diffraction from a binary reflective phase grating.

Referring to FIG. 2 providing a description of the diffraction of an incident light beam 11. Periodic corrugations on optical surfaces (i.e. diffraction gratings) are well known to perturb the directionality of incident light beam 11. Collimated light incident in air upon a grating is diffracted into a number of different orders, as described by the grating equation (1), $$\frac{2\pi}{\lambda}\sin\theta_m = \frac{2\pi}{\lambda}\sin\theta_0 + \frac{2m\pi}{\Lambda}, \qquad (1)$$

where $\lambda$ is the wavelength of the incident light and m is an integer denoting the diffracted order. FIG. 2 illustrates a reflective grating 10 having an incident beam 11 incident on the grating 10 at an angle $\theta_0$. The grating surface is defined to have a period $\Lambda$, which defines the angles of diffraction according to the relation presented in Equation 1. A diffracted beam 13 corresponding to diffraction order m exits the grating 10 at an angle $\theta_m$.

The diffraction grating 10 shown in FIG. 2 is a binary or bi-level grating where the grating profile is a square wave. The duty cycle is defined as the ratio of the width of the groove $L_1$ to the grating period $\Lambda$. A binary phase grating will have the maximum diffraction efficiency when the duty cycle is equal to 0.5 and R, the reflectivity, is equal to 1.0.

For uniform reflectivity and 0.5 duty cycle, the relation presented for scalar diffraction theory in Equation 2 is appropriate for the calculation of the theoretical efficiency of diffraction (see M. Born and E. Wolf, *Principles of Optics*, 6$^{th}$ ed., Pergamon Press, Oxford, 1980, pp. 401–405).

$$\eta_m = R\cos^2\left(\frac{\pi}{\lambda}(q_m d - m\lambda/2)\right)\frac{\sin^2(m\pi/2)}{(m\pi/2)^2}, \qquad (2)$$

where $q_m$ is a geometrical factor,

-continued $$q_m = \cos\theta_0 + \cos\theta_m \qquad (3)$$
$$= 1 + \sqrt{1 - (m\lambda/\Lambda)^2} \text{ for normal incidence.}$$

For normally incident illumination, the maximum efficiency in the first order (m=1) occurs when the grating depth, d=λ/4. Such a grating has equal diffraction efficiencies into the +1 and −1 orders of approximately 40% for the gratings of interest (λ/Λ≦0.5), while the remaining light is diffracted into higher odd orders (i.e. ±3, ±5, etc.).

Figure 3:
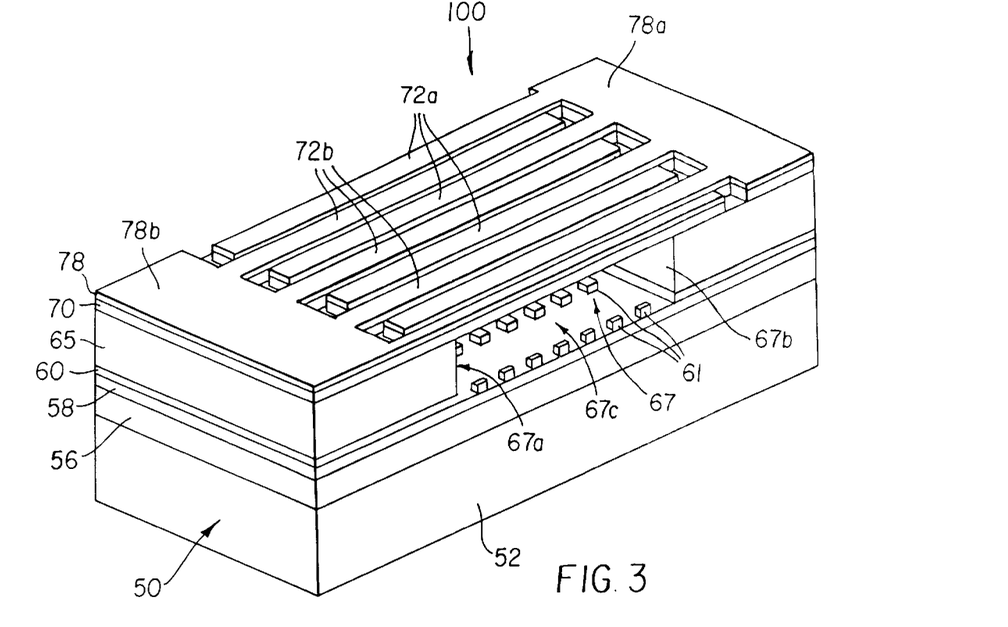
FIG. 3 is a perspective, partially cut-away view of the mechanical grating device of the present invention.

FIG. 3 is a perspective, partially cut-away view of a mechanical grating device 100 of the present invention. The mechanically deformable structures of the mechanical grating device 100 are formed on top of a base 50. The present embodiment as shown in FIG. 3 discloses a mechanical grating device 100 which can be operated with by the application of an electrostatic force. According to the fact, that the actuation force of the mechanical gating device 100 is electrostatic the base 50 comprises the several layers of different materials. The base 50 comprises a substrate 52. The material of the substrate 52 is chosen from the materials glass, plastic, metal and semiconductor material. The substrate 52 is covered by a bottom conductive layer 56. In this embodiment the thin bottom conductive layer 56 is necessary since it acts as an electrode for applying the voltage to actuate the mechanical grating device 100. The thin bottom conductive layer 56 is covered by a protective layer 58. The bottom conductive layer 56 is selected from the group consisting of aluminum, titanium, gold, silver, tungsten, silicon alloys and indium tinoxide. Above the protective layer 58 a standoff layer 60 is formed which is followed by a spacer layer 65. On top of the spacer layer 65, a ribbon layer 70 is formed which is covered by a reflective layer 78. In the present embodiment the reflective layer 78 has also to be conductive in order to provide electrodes for the actuation of the mechanical grating device 100. The electrodes are patterned from the reflective and conductive layer 78.

The spacer layer 65 has a longitudinal channel 67 formed therein. The longitudinal channel 67 comprises a first a second side wall 67a and 67b and a bottom 67c. The channel 67 is open to the top and covered by a first and a second set of deformable ribbon elements 72a and 72b. Each deformable ribbon element 72a and 72b spans the channel 67 and is secured to the surface of the spacer layer 65 on either side of the channel 67. The bottom 67c of the channel 67 is covered by a protective layer 58. As mentioned above, the ribbon layer 70 is covered by the reflective layer 78. The reflective layer 78 (conductive) is patterned such that there is a first and a second conducting region 78a and 78b. Both, the first and the second conductive region 78a and 78b have according to the patterning, a comb-like structure and are arranged at the surface of the mechanical grating 100 device in an interdigitated manner. The first and second conductive region 78a and 78b are mechanically and electrically isolated from one another. According to the pattern of the reflective layer 78 the ribbon layer 70 is patterned in the same manner. As a result there are the first and the second set of deformable ribbon elements 72a and 72b spanning the channel 67 and in the direction of the channel 67 are arranged such that every other deformable ribbon element belongs to one set.

In the embodiment as shown in FIG. 3 a plurality of standoffs 61 are positioned on the bottom 67c of the channel 67. The standoffs 61 are patterned from the standoff layer 60 such that a group of standoffs 61 is associated only with the deformable ribbon elements 72a and 72b of the first or the second set. In the embodiment shown here, the group of standoffs 61 is associated with the second set of deformable ribbon elements 72b. The standoffs 61 may also be patterned in the form of a single bar.

Figure 4:
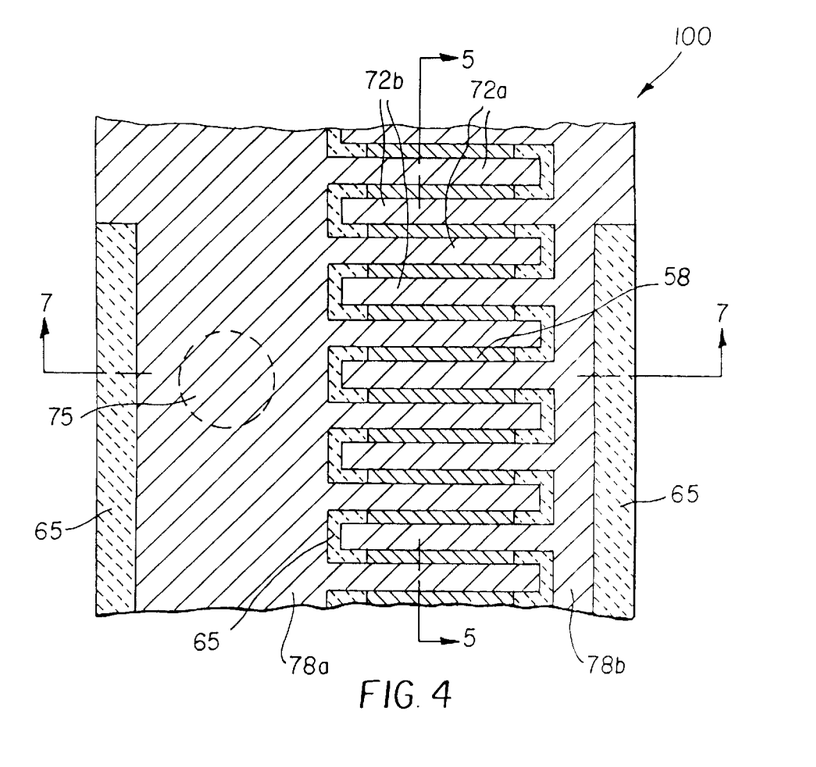
FIG. 4 is a top view of the mechanical grating device of the present invention.
Figure 5:
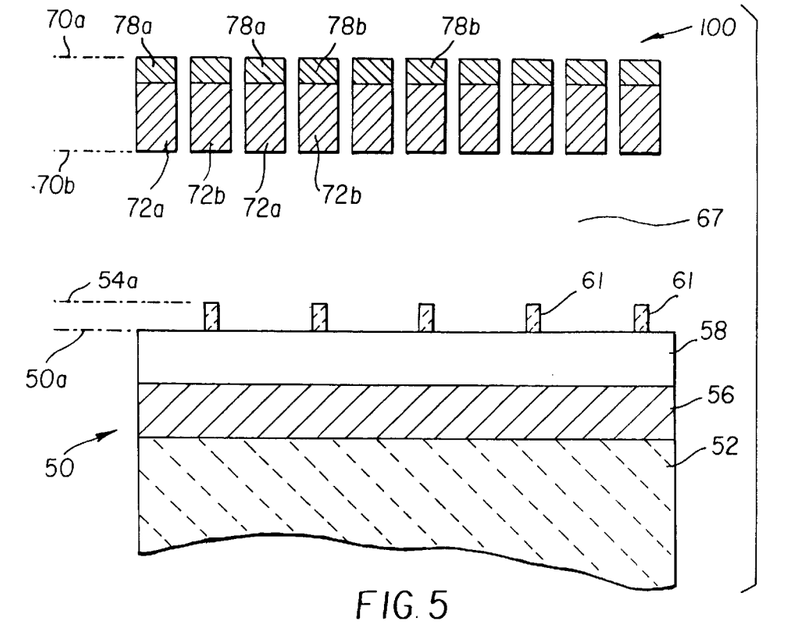
FIG. 5 is a cross-sectional view along plane B—B indicated in FIG. 4 of one embodiment without and applied force to the deformable ribbons.
Figure 6:
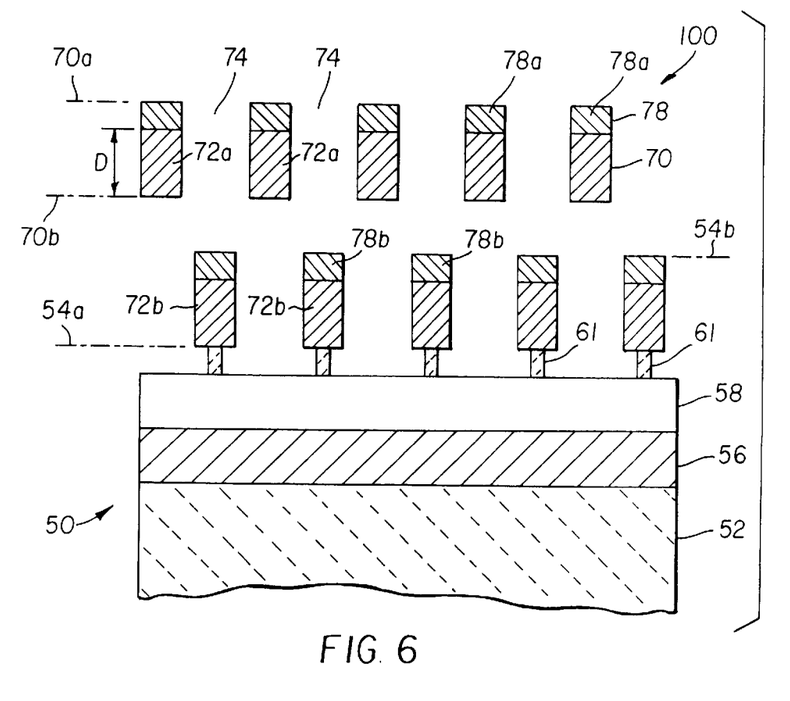
FIG. 6 is a cross-sectional view along plane B—B indicated in FIG. 4 of one embodiment with and applied force to the deformable ribbons
Figure 7:
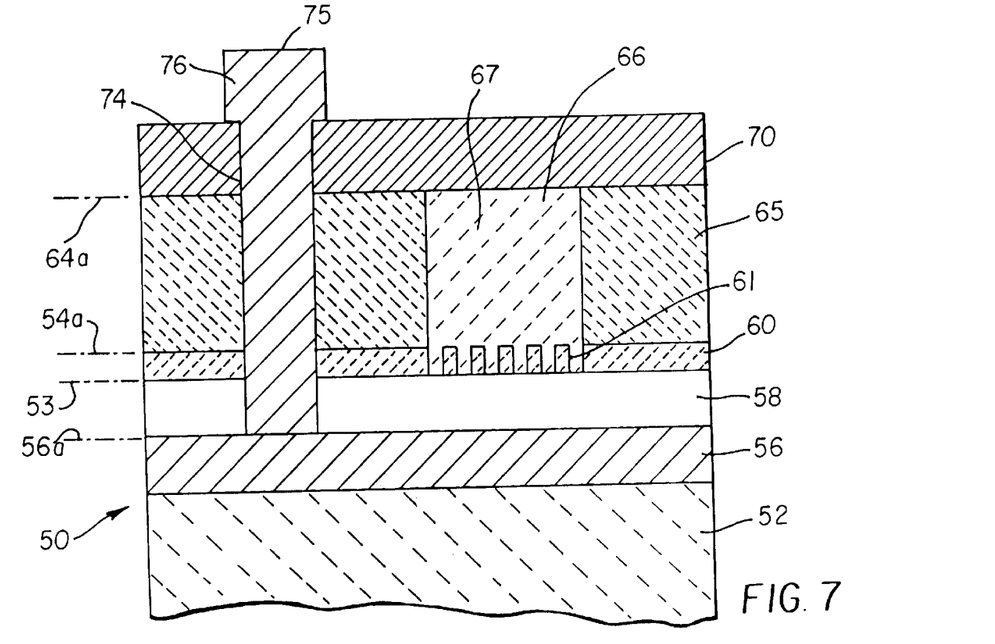
FIG. 7 is a cross-sectional view along plane A—A indicated in FIG. 4 to illustrate the provision of an interconnection between the ribbon layer and the base.
Figure 8:
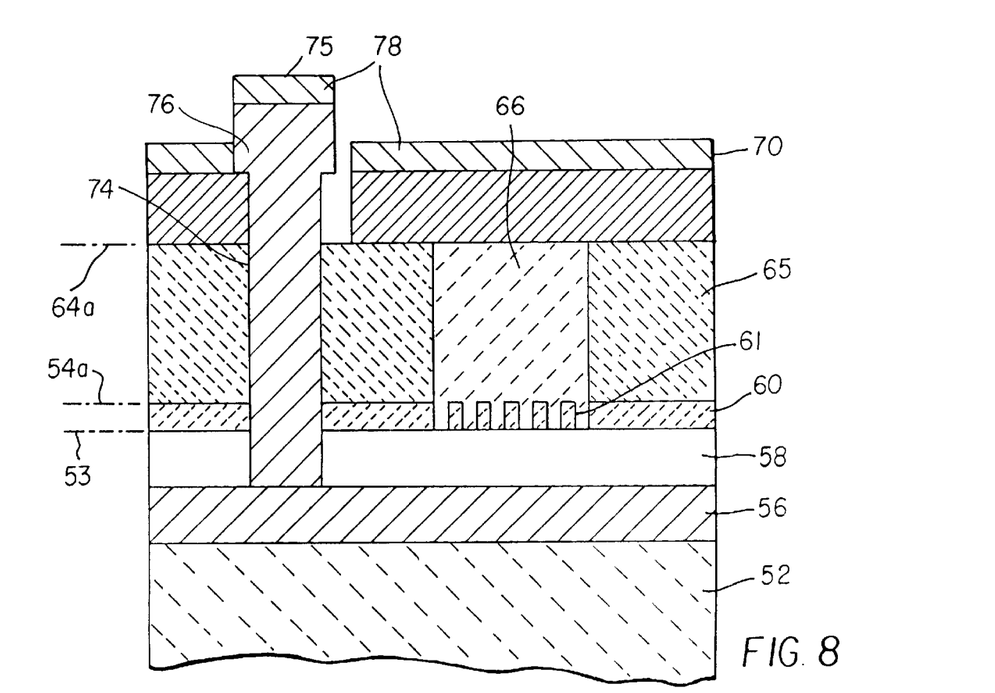
FIG. 8 is a cross-sectional view along plane A—A indicated in FIG. 4 to illustrate the provision of a reflective layer.
Figure 9:
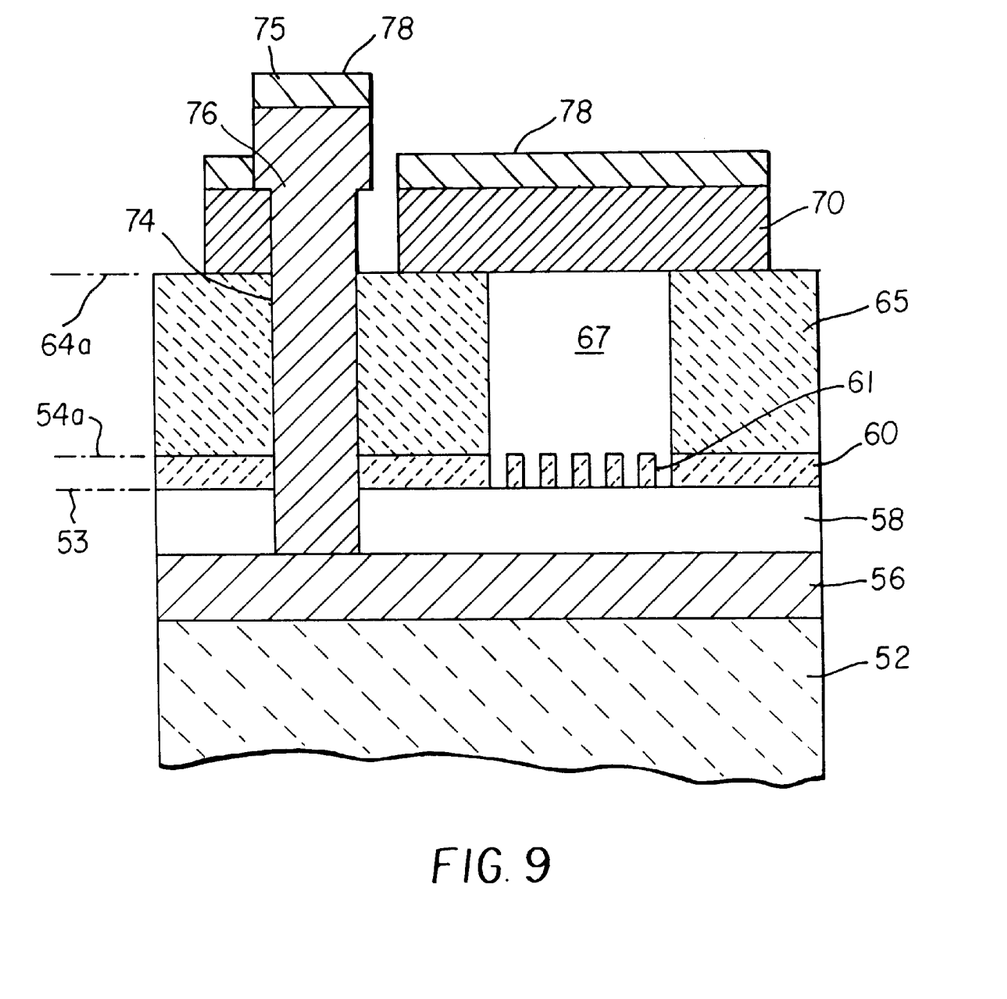
FIG. 9 is a cross-sectional view along plane A—A indicated in FIG. 4 to illustrate device after the last process step.

Referring to FIG. 4, a top view of the mechanical grating device of the present invention is shown. A first view plane A—A, perpendicular to the length of the mechanical grating device 100 provides a cross-sectional view of the mechanical grating device 100 as shown in FIGS. 7 to 9. A second view plane B—B, perpendicular to the first view plane A—A of the mechanical grating device 100 provides a cross-sectional view of the mechanical grating device 100 as shown in FIGS. 5 and 6. The mechanical grating device 100 as shown is FIG. 4 is a device which can be actuated by the application of an electrostatic force. A first and a second, electrically conducting region 78a and 78b are formed on the surface of the mechanical grating device 100. The first and the second electrically conducting region 78a and 78b are isolated from each other to allow the application of voltage to either the first or the second set of deformable ribbon elements 72a and 72b. The first conducting region 78a applies the voltage to the first set of deformable ribbon elements 72a and the second conducting region 78b provides the voltage to the second set of deformable ribbon elements 72b. The first conducting region 78a is in contact with the bottom conductive layer 56 (see FIG. 8) designated at the base 50. The thin bottom conducting layer 56 may be formed above any layer which is below the bottom 67c of the channel 67. From the view of FIG. 4, regions of the spacer layer 65 and protective layer 58 are visible because of patterning of first and second conductive region 78a and 78b to achieve electrical and mechanical isolation of the deformable ribbon elements 72a and 72b. For operation of the mechanical grating device 100 the electrostatic force is produced by a voltage difference between the thin bottom conductive layer 56 and the first or the second conducting layer 78a or 78b which are formed atop of each deformable ribbon element 72a and 72b. It s easily understood that a conductive layer can also be formed at the bottom surface 70b of each deformable ribbon element 72a or 72b. Additionally, the conductive layer can be located within each deformable ribbon element 72a and 72b.

FIG. 5, a cross-sectional view along plane B—B, illustrates the mechanical grating device 100 with no applied voltage to the second conductive region 78b. In case there is no voltage applied between the thin bottom conducting layer 56 and the first or the second conducting layer 78a or 78b, which are formed atop of each deformable ribbon element 72a and 72b, all of the ribbon elements 72a and 72b are coplanar. In the embodiment shown in FIG. 5 the top layer on the deformable ribbon elements 72a and 72b is a reflective and conductive layer 78a and 78b which defines a top surface 70a of the coplanar ribbon elements 72a and 72b. The surface of the ribbon elements 72a and 72b facing the base 50 of the mechanical grating device 100 is designated as a bottom surface 70b. On the top surface 50a of the base 50 a plurality of standoffs 61 are formed. Each standoff 61 defines a top surface 54a which faces the bottom surface 70b of the of the ribbon elements 72a and 72b. The depth of the channel 67 is defined by the distance between the bottom surface 70b of the ribbon elements 72a and 72b and the top surface 50a of the base 50 or the top surface 54a of the standoffs 61. The plurality of standoffs 61 is distributed on the top surface 50a of the base 50, such that every second deformable ribbon element 72a or 72b is associated with a standoff 61 (here the second set of deformable ribbon elements 72b). According to the embodiment shown in FIG.

5 the base 50 is formed by the substrate 52 which has the bottom conductive layer 56 formed thereon. The sandwich of the substrate 52 and the bottom conductive layer 56 is covered with a protective layer 58 which is the top layer of the base 50.

FIG. 6, a cross-sectional view along plane B—B, illustrates the mechanical grating device 100 with an applied voltage to the second conductive region 78b in order to demonstrate the actuation of the second set of deformable ribbon elements 72b. FIG. 6 illustrates the height change, for example of the second set of deformable ribbon elements 72b, in case a voltage is applied between the conductive layer 78b on top of the second set of deformable elements 72b and the bottom conductive layer 56. According to the voltage difference the actuated ribbons (here: the second set of deformable ribbon elements 72b) make contact with the standoffs 61. The separation of the top surface 70a of the coplanar not actuated ribbon elements 72a and a top surface 54b of the coplanar actuated ribbon elements 72b is designed to maximize the efficiency of diffraction by control of the depth of the channel 67 and the heights of the standoffs 61. The thickness D of the ribbon layer 70 is selected to optimize performance by influencing the electrostatic force required for actuation and the returning force affecting the speed and resonance amplitudes of the device attributed to the tensile stress of the ribbon layer 70.

FIG. 7 is a cross-sectional view along plane A—A as indicated in FIG. 4 to illustrate the provision of an interconnection 75 between the ribbon layer 70 and the base 50. In the illustrated embodiment the base 50 is formed by the substrate 52 which is covered by the bottom conductive layer 56 which defines a surface 56a. On top of the bottom conductive layer 56 the protective layer 58 is formed. Contact to the bottom conductive layer 56 is accomplished by etching at least one opening 74 through the multilayered device. The multilayered device comprises the base 50 (composition of the base 50 see above) defining a surface 53. The surface is covered with a standoff layer 60 being patterned in the area of the channel 67. The patterning process defines the plurality of standoffs 61. The standoff layer 60 is covered by a spacer layer 65 which has the channel 67 formed therein. The channel 67 is filled with a material 66 different to the material of the spacer layer 65. The material 66 in the channel 67 and the material of the spacer layer define the coplanar surface 64a of the later formed deformable ribbon elements 72a and 72b. Preferably, the coplanar surface 64a is precisely optically coplanar over the entire length of the the later formed deformable ribbon elements 72a and 72b which span channel 67 such that a light beam reflected from this surface or from the bottom surface 70b before removal of material 66 in the channel 67 would always be reflected specularly if it were scanned along these surfaces, providing the beam did not impinge on the edges of elements 72a or 72b. As is well known in the practice of optical engineering, this requires a surface planarity of less than about 200 Angstrom units. In this case surface 70b remains optically coplanar after removal of the material 66 and the ribbon elements 72a and 72b remain optically coplanar on both their bottom and top surfaces after removal of the material 66 providing the material of ribbon elements 72a and 72b was deposited with uniform thickness and uniform tensile stress. In this case ribbon elements 72a and 72b have no mechanically irregularities at the points at which they contact spacer layer 65, thereby ensuring the ribbons pull down uniformly and predictably during device operation. On top of the coplanar surface 64a a ribbon layer 70 is formed. The opening 74 is filled by a thick conducting layer 76 which is for example an aluminum alloy. The conductive layer 76 is limited by photolithographic processing and etching methods to a small area coated by the thick conducting layer 76.

FIG. 8 is a cross-sectional view along plane A—A indicated in FIG. 4 to illustrate the provision of a reflective layer 78. Since in the present embodiment the force applied to the deformable ribbon elements 72a and 72b is an electrostatic force, the reflective layer 78 deposited atop the ribbon layer 70 is also conductive. This is an ideal combination because the conducting layer being reflective improves the efficiency of diffraction.

FIG. 9 is a cross-sectional view along plane A—A indicated in FIG. 4 to illustrate the device after the last process step. As illustrated in FIG. 9 the conducting layer 78 and ribbon layer 70 are patterned using photolithographic processing. First the conducting layer 78 is etched followed by the etching of the ribbon layer 70 using the remaining conducting layer 78 as a mask for etching. This etching process defines first and second conducting region 78a and 78b of the conducting layer 78 to achieve electrical and mechanical isolation. Finally, the sacrificial layer 66 filling the channel 67 is removed by dry etching methods using xenon difluoride to yield the device cross-sectional view illustrated in FIG. 9. Now the patterned deformable ribbon elements 72a and 72b are suspended above the channel 67. Preferably ribbon elements 72a and 72b precisely optically coplanar over their entire length .

The invention has been described in detail with particular reference to certain preferred embodiments thereof, but it will be understood that variations and modifications can be effected within the spirit and scope of the invention.

| PARTS LIST | |
|---|---|
| 10 | prior art light modulator |
| 10 | diffraction grating |
| 11 | incident light beam |
| 12 | deformable elements |
| 13 | diffracted beam |
| 14 | frame |
| 16 | spacer layer |
| 22 | substrate |
| 24 | passivating layer |
| 26 | conducting layer |
| 30 | thin layer |
| 50 | base |
| 50a | top surface of base |
| 52 | substrate |
| 53 | surface of the base |
| 54a | top surface of standoffs |
| 54b | top surface of actuated ribbon elements |
| 56 | thin bottom conductive layer |
| 56b | surface of conductive layer |
| 58 | protective layer |
| 60 | standoff layer |
| 61 | standoff |
| 64a | coplanar surface |
| 65 | spacer layer |
| 66 | material filled in the channel 67 |
| 67 | channel |
| 70 | ribbon layer |
| 70a | top surface of the coplanar ribbon elements |
| 70b | bottom surface of the coplanar ribbon elements |
| 72a | first set of deformable ribbon elements |
| 72b | second set of deformable ribbon elements |
| 74 | opening |
| 75 | interconnection |
| 76 | thick conducting layer |
| 78a | first conducting region |
| 78b | second conducting region |
| 100 | mechanical grating device |

-continued

PARTS LIST

| | |
|---|---|
| A—A | first view plane |
| B—B | second view plane |
| $\theta_0$ | angle of incident light beam |
| m | diffraction order |
| $\theta_m$ | exit angle of the diffracted light beam |
| Λ | groove width |
| $L_1$ | period of the grating |
| d | grating depth |
| D | thickness of the ribbon layer |

What is claimed is:

1. A mechanical grating device comprising:

a base having a surface;

a spacer layer provided above the base, said spacer layer defining an upper surface and a longitudinal channel is formed in said spacer layer, said channel having a first and second opposing side wall and a bottom, said side walls being substantially vertically disposed with respect to the bottom, and said channel having a constant cross section along the entire length of the mechanical grating device;

a plurality of spaced apart deformable ribbon elements disposed parallel to each other and spanning the channel, said deformable ribbon elements are fixed to the upper surface of the spacer layer on each side of the channel; and wherein a plurality of spaced apart standoffs are formed on the bottom of said channel.

2. The mechanical grating device as recited in claim 1 wherein each deformable ribbon element has an upper surface and an lower surface, said upper and lower surface are optically planar, and all of the deformable ribbon elements have a constant cross section with respect to the entire length of the device.

3. The mechanical grating device as recited in claim 1 wherein the deformable ribbon elements are arranged in a first and second interdigitating set; said deformable elements of one set are mechanically isolated from the deformable ribbon elements of the other set.

4. The mechanical grating device as recited in claim 1 wherein each second deformable ribbon element is associated with a standoff.

5. The mechanical grating device as recited in claim 1 wherein a conductive layer is part of the deformable ribbon elements.

6. The mechanical grating device as recited in claim 1 wherein a conductive layer is provided which also covers the upper surface of the deformable ribbon elements.

7. The mechanical grating device as recited in claim 6 wherein the conductive layer has light reflecting properties.

8. The mechanical grating device as recited in claim 1 comprises at least one electrical conductive interconnect in the spacer layer wherein the electrical conductive interconnect provides a connection to a conductive layer in the base.

9. The mechanical grating device as recited in claim 8 wherein the base comprises a substrate covered by a protective layer.

10. The mechanical grating device as recited in claim 9 wherein the base is formed by a conductive layer on top of the substrate, the conductive layer is followed by the protective layer and a standoff layer is provided on top of the protective layer.

11. The mechanical grating device as recited in claim 9 wherein the base is formed by the protective layer on top of the substrate, and a conductive layer is provided on top of the protective layer which is followed by a standoff layer.

12. The mechanical grating device as recited in claim 9 wherein the material of the substrate is selected from the group consisting of glass, plastic, metal and semiconductor material.

13. The mechanical grating device as recited in claim 1 wherein the spacer layer is selected from the group consisting of silicon oxide, silicon nitride and polyimide.

14. The mechanical grating device as recited in claim 8 wherein the conductive layer is selected from the group consisting of aluminum, titanium, gold, silver, tungsten, silicon alloys and indium tinoxide.

15. A electromechanical grating device comprising:

a base having a surface;

a bottom conductive layer provided within said base;

a spacer layer provided above the base, said spacer layer defining an upper surface and a longitudinal channel is formed in said spacer layer, said channel having a first and a second opposing side wall and a bottom, said side walls being substantially vertically disposed with respect to the bottom, and said channel having a constant cross section along the entire length of the mechanical grating device; and a plurality of spaced apart deformable ribbon elements disposed parallel to each other and spanning the channel, said deformable ribbon elements are fixed to the upper surface of the spacer layer on each side of the channel and each deformable ribbon element is provided with a conductive layer.

16. The mechanical grating device as recited in claim 15 wherein each deformable ribbon element has an upper surface and an lower surface, said upper and lower surface are optically planar and all of the deformable ribbon elements have a constant cross section with respect to the entire length of the device.

17. The mechanical grating device as recited in claim 15 wherein the deformable ribbon elements are arranged in a first and second interdigitating set; said deformable elements of one set are mechanically and electrically isolated from the deformable ribbon elements of the other set.

18. The mechanical grating device as recited in claim 15 wherein a plurality of spaced apart standoffs are formed on the bottom of said channel.

19. The mechanical grating device as recited in claim 18 wherein each second deformable ribbon element is associated with a standoff.

20. The mechanical grating device as recited in claim 15 wherein the conductive layer covers the upper surface of the deformable ribbon elements and possesses light reflecting properties.

21. The mechanical grating device as recited in claim 15 comprises at least one electrical conductive interconnect in the spacer layer wherein the electrical conductive provides a connection to a conductive layer in the base.

22. The mechanical grating device as recited in claim 15 wherein the base comprises a substrate covered by a protective layer.

23. The mechanical grating device as recited in claim 22 wherein the base is formed by the bottom conductive layer on top of the substrate, the conductive layer is followed by the protective layer and a standoff layer is provided on top of the protective layer.

24. The mechanical grating device as recited in claim 22 wherein the material of the substrate is selected from the group consisting glass, plastic, metal and semiconductor material.

25. The mechanical grating device as recited in claim 15 wherein the spacer layer is selected from the group consisting of silicon oxide, silicon nitride and polyimide.

26. The mechanical grating device as recited in claim 15 wherein the conductive layer is selected from the group consisting of aluminum, titanium, gold, silver, tungsten, silicon alloys and indium tinoxide.

* * * * *